US012752619B2

(12) United States Patent
Schramm

(10) Patent No.: US 12,752,619 B2
(45) Date of Patent: Oct. 6, 2026

(54) ELECTRICALLY DRIVEN AXLE

(71) Applicant: MERITOR ELECTRIC VEHICLES GERMANY GMBH, Nuremberg (DE)

(72) Inventor: Marco Schramm, Nuremberg (DE)

(73) Assignee: MERITOR ELECTRIC VEHICLES GERMANY GMBH, Nuremberg (DE)

( * ) Notice: Subject to any disclaimer, the term of this patent is extended or adjusted under 35 U.S.C. 154(b) by 279 days.

(21) Appl. No.: 18/693,569

(22) PCT Filed: Aug. 10, 2022

(86) PCT No.: PCT/EP2022/072392
§ 371 (c)(1),
(2) Date: Mar. 20, 2024

(87) PCT Pub. No.: WO2023/051984
PCT Pub. Date: Apr. 6, 2023

(65) Prior Publication Data

US 2024/0399851 A1 Dec. 5, 2024

(30) Foreign Application Priority Data

Sep. 28, 2021 (EP) .................................... 21199482

(51) Int. Cl.
*B60K 7/00* (2006.01)
*B60K 17/04* (2006.01)
*H02K 7/08* (2006.01)

(52) U.S. Cl.
CPC .......... *B60K 7/0007* (2013.01); *B60K 17/043* (2013.01); *H02K 7/08* (2013.01); *B60K 2007/0061* (2013.01)

(58) Field of Classification Search
CPC ...... B60K 7/0007; B60K 7/00; B60K 7/0015; B60K 7/0023; B60K 17/043; B60K 2007/0061; B60K 2007/0038; H02K 7/08
See application file for complete search history.

(56) References Cited

U.S. PATENT DOCUMENTS 5,829,542 A * 11/1998 Lutz ......................... B60K 6/46 280/124.156
6,720,702 B2 * 4/2004 Knauff ..................... H02K 1/30 310/261.1

(Continued)

FOREIGN PATENT DOCUMENTS

DE 4421425 C1 8/1995
DE 10126340 A1 12/2002

(Continued)

OTHER PUBLICATIONS

International Search Report dated Nov. 29, 2022 for related PCT Appln. No. PCT/EP2022/072392; 10 pages.

*Primary Examiner* — John D Walters
(74) *Attorney, Agent, or Firm* — Brooks Kushman P.C.

(57) ABSTRACT

A commercial vehicle, such as an electric bus, comprising at least one electrically driven axle having a transmission-motor unit associated with at least one wheel assembly. A motor of the transmission-motor unit comprises a stator and a rotor. The rotor is connected in a torque-transmitting manner to a respective wheel assembly via a transmission. The rotor has an overhung bearing, and the rotor is mounted by the bearing of the transmission.

19 Claims, 5 Drawing Sheets

(56) References Cited

U.S. PATENT DOCUMENTS

Figure 1:
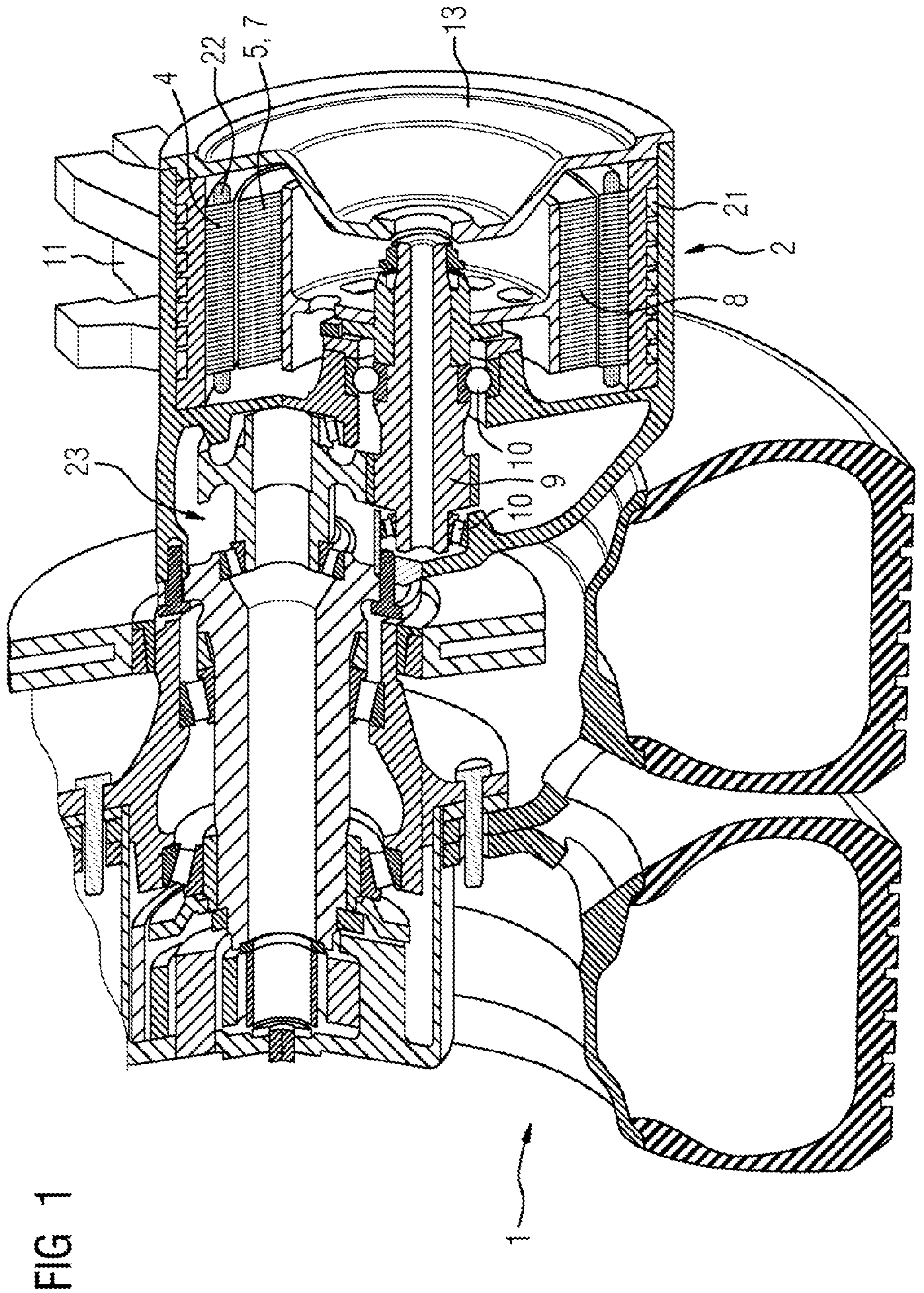

| | | | | |
|---|---|---|---|---|
| 6,722,459 | B1 * | 4/2004 | Wendl | B60L 15/2054<br>180/65.51 |
| 10,663,051 | B2 * | 5/2020 | Wang | B60K 1/02 |

FOREIGN PATENT DOCUMENTS

| | | | |
|---|---|---|---|
| EP | 0249807 | A1 | 12/1987 |
| EP | 1329352 | A2 | 7/2003 |
| WO | 01/03963 | A1 | 1/2001 |

* cited by examiner

ELECTRICALLY DRIVEN AXLE

CROSS-REFERENCE TO RELATED APPLICATIONS

This application is the U.S. national phase of PCT Application No. PCT/EP2022/072392, filed Aug. 10, 2022, which claims priority to European Patent Application No. 21199482.7, filed Sep. 28, 2021, the disclosures of which are incorporated in their entirety by reference herein.

The invention relates to an electrically driven axle for commercial vehicles which is driven by means of two electric motors, which are associated with the drive wheels, and an associated transmission.

Commercial vehicles, such as buses and trucks, are usually driven by combustion engines, dynamoelectric machines or hybrid combinations of the two. In electrically driven commercial vehicles there are central motor concepts which drive a drive axle directly or by way of an upstream transmission. This takes place in each case by way of a mechanical axle differential. Electrically driven commercial vehicles can, however, also be driven by way of electric axles which have a motor for each wheel side.

Wheel bearings, transmission bearings and dynamoelectric machines each have their own bearing with their necessary degrees of freedom. The dynamoelectric machine is usually connected on the rotor side by way of a coupling to a transmission input shaft and on the stator side to an axle housing.

However, the additional radial and axial bearing points of the dynamoelectric machine represent a mechanical overdetermination of the drive axle, so that the coupling between the wheel and the motor shaft, or rotor shaft, must have a correspondingly flexible design.

Proceeding therefrom, the invention is based on the object of providing an electric axle which has a simple, compact construction and avoids the disadvantages mentioned above. There is further to be provided a commercial vehicle which has inter alia a space-optimized form.

The stated object is achieved by an electrically driven axle of a commercial vehicle, having a transmission-motor unit associated with each wheel assembly, wherein the motor has a stator and a rotor, wherein the rotor is connected in a torque-transmitting manner to the respective wheel assembly by way of a transmission, wherein the rotor is in each case in an overhung position.

According to the invention, the dynamoelectric rotatory machines are each designed without bearings, that is to say are in an overhung position, so that the bearing of the transmission additionally takes over the rotating active part components of the electric machine. Active part components are here understood as being the lamination stack of the rotor, in which permanent magnets and/or an electrically conducting cage are embedded.

According to the invention, the bearing of a transmission input shaft is thus to be designed such that the mechanical loads of the rotor of the dynamoelectric machine that are additionally introduced are also absorbed. It is further particularly advantageous if the additional weight and moment of inertia of the rotor are as low as possible.

Advantageously, the active parts of the rotor are here positioned on a weight-optimized rotor hub which transmits the torque to the shaft without itself having a large moment of inertia and large masses.

The rotor of the dynamoelectric machine is mounted in a rotationally fixed manner directly on the transmission input shaft, wherein the stator of the dynamoelectric machine is mechanically connected to an axle housing.

The rotationally fixed connection is ensured, for example, by shaft-hub connections known per se. The stator of the dynamoelectric machine is accommodated in the axle housing by way of a shrink fit, for example. In particular in the region of the stator, the axle housing can also be in the form of a liquid cooling jacket. The axle housing holds the transmission and the motor and thus forms a transmission-motor unit.

It is then possible to dispense with a flexible coupling between the transmission and the dynamoelectric machine, wherein it is thus possible in particular according to the invention also to reduce demands on the mechanical tolerances, the required installation space and also the weight of the drive.

In one embodiment, the transmission is a reduction transmission, so that the torque which “arrives” at the wheel is increased to the same extent as the speed is reduced. The power that is transmitted from the dynamoelectric machine to the wheel of course remains the same.

In a further embodiment, the rotor has a weight-optimized design, so that the bearing of the transmission, which according to the invention takes over the bearing of the rotor, is not overloaded. This is achieved in particular by a spoke-like support structure of the active part of the rotor or of the rotor. The active parts, such as the lamination stack of the rotor, in which permanent magnets and/or an electrically conducting cage are embedded, are fixed in a rotationally fixed manner on the spoke-like support structure and connected to a transmission input shaft.

The axial extent of the rotor and the distance from the bearing are to be as small as possible in relation to the span of the bearing of the transmission input shaft. In particular, the axial extent of the rotor corresponds to 0.3 to 0.7 times the diameter of the rotor.

It is advantageous here if the axial extent of the rotor is as small as possible, that is to say corresponds approximately to half the diameter of the rotor.

By means of the electric axle according to the invention, a commercial vehicle is now able, by means of a superordinate controller of its electric drive, to form an electric differential, as a result of which steering movements in the sense of changes of direction are also possible.

Commercial vehicles are especially electrically driven buses or trucks for road traffic, or are special vehicles, for example in mines. In principle, the invention is also suitable for all electrically driven vehicles having an electric axle and the two transmission-motor units thereof, thus also for passenger cars.

The subject matter of the invention is applicable both to internal rotor machines and to external rotor machines, since the bearing of the rotor is taken over completely by the bearing of the transmission. It must simply be ensured that the weight of the rotor is kept as low as possible and that the axial extents, in particular the distance from the bearing, are kept small in relation to the span of the bearing.

By integrating the dynamoelectric machine in the axle housing without bearings, installation space, weight and thus also costs can be saved compared to comparable drive concepts. As a result, it is possible to achieve significantly more motor power and also torque in the available installation space of a commercial vehicle.

Electric buses with an overall weight of up to 30 t can thus also be produced with an electric axle. Conventional solutions with a motor bearing require two bearing shields and ball bearings, which also have to be maintained, in particular lubricated.

The electric axle according to the invention advantageously has maintenance-free oil-lubricated bearings in the transmission.

Figure 2:
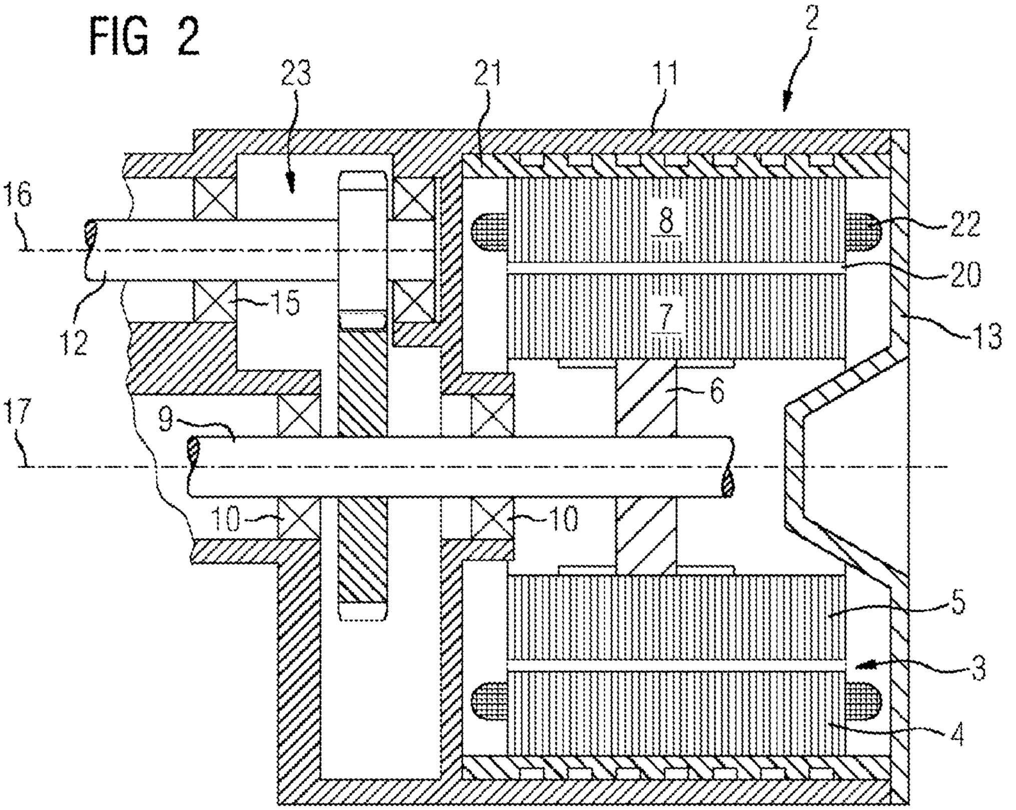
Figure 3:
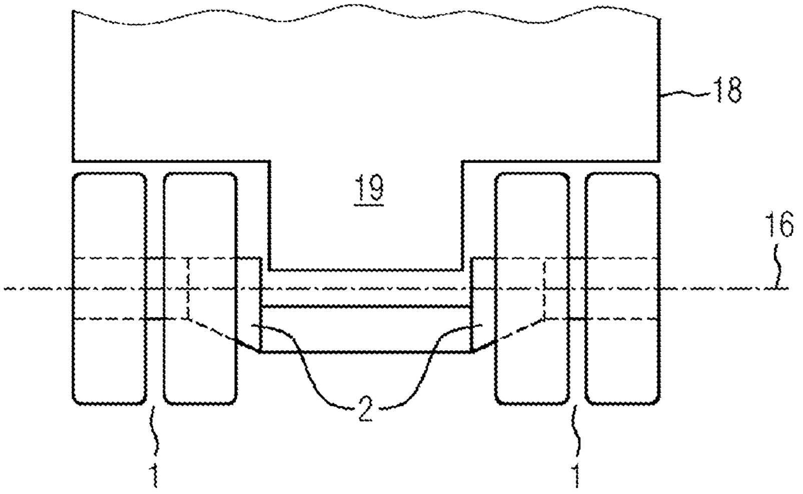
Figure 4:
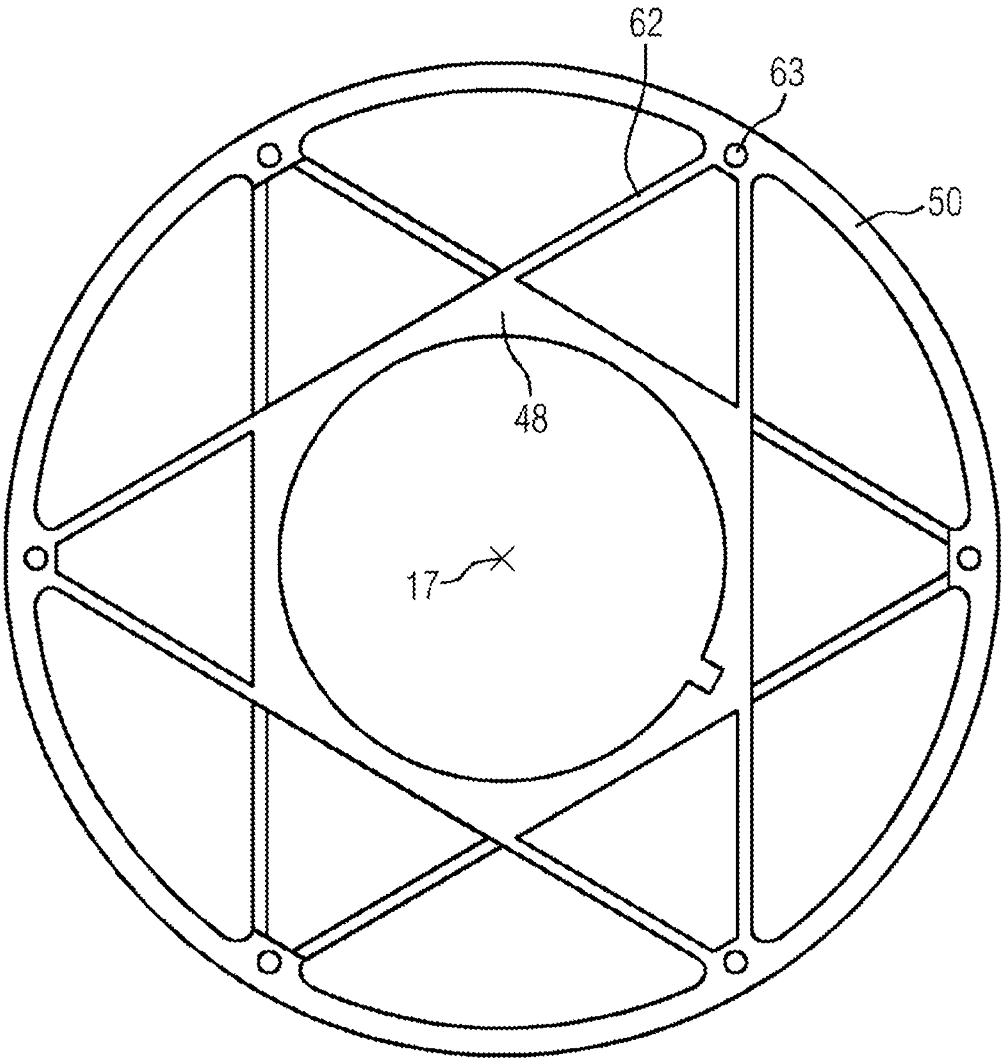
Figure 5:
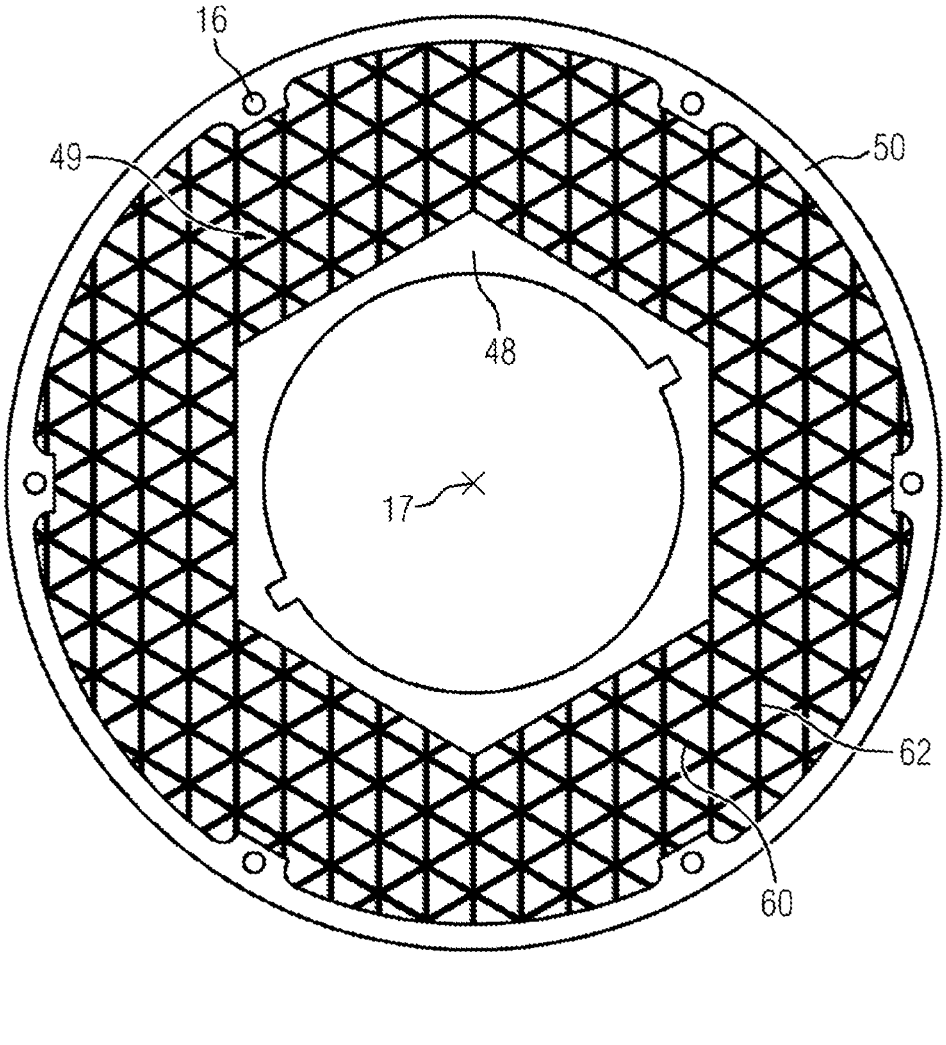
Figure 6:
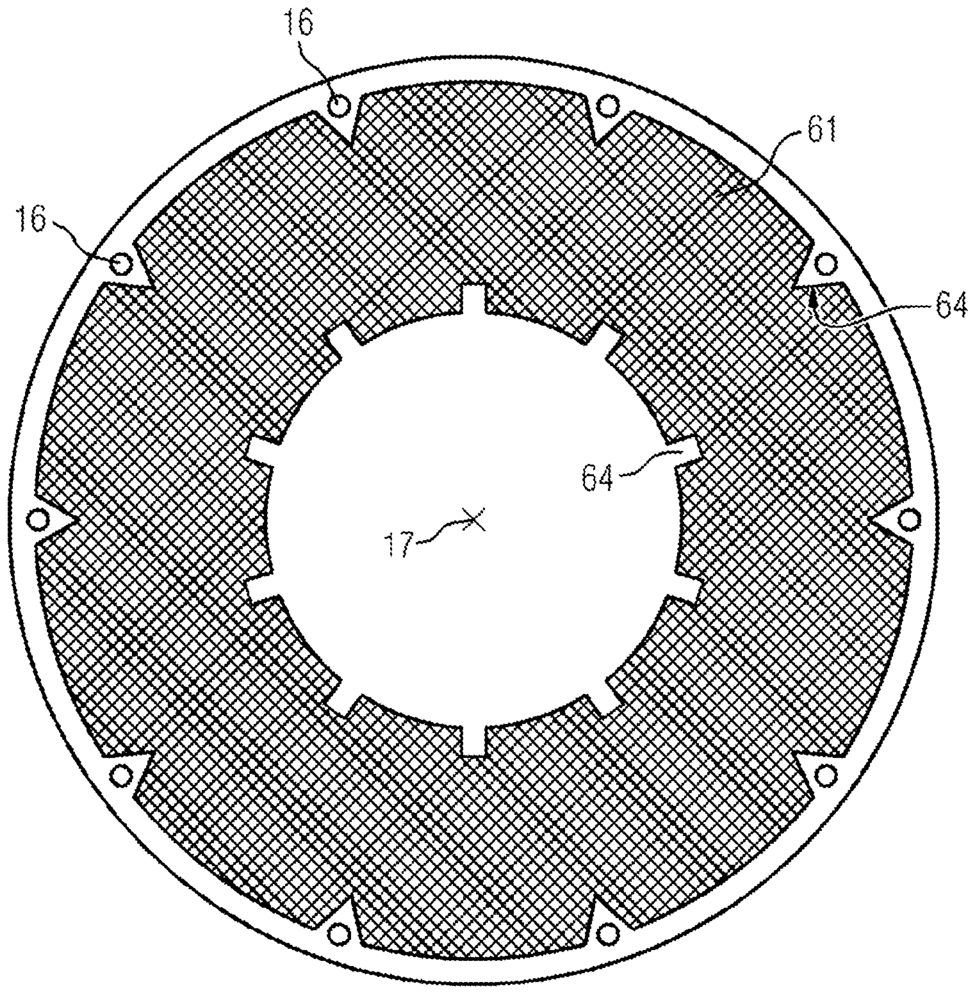

The invention and further advantageous embodiments of the invention will be explained in greater detail by means of exemplary embodiments which are shown in principle, in which:

FIG. 1 shows a representation, partially in perspective, of a drive of a wheel, FIG. 2 shows a longitudinal section in principle of a motor-transmission unit, FIG. 3 shows an arrangement in principle of an electric axle in a commercial vehicle, FIGS. 4 to 6 show low-inertia forms of a rotor.

It should be noted that terms such as "axial", "radial", "tangential", etc. relate to the axis 7 that is used in the figure in question or in the example that is being described in a particular case. In other words, the directions axial, radial, tangential always relate to an axis 7 of the rotor 5 and thus to the corresponding axis of symmetry of the stator 2. "Axial" describes a direction parallel to the axis, "radial" describes a direction orthogonal to the axis, toward or also away from the axis, and "tangential" is a direction which is at a constant radial distance from the axis and, in the case of a constant axial position, is directed in a circular manner around the axis. The expression "in the circumferential direction" is synonymous with "tangential".

In relation to a surface, for example a cross-sectional surface, the terms "axial", "radial", "tangential", etc. describe the orientation of the normal vector of the surface, that is to say of the vector that is perpendicular to the surface in question.

The expression "coaxial components", for example coaxial components such as the rotor 5 and the stator 4, is here understood as meaning components which have the same normal vectors, that is to say for which the planes defined by the coaxial components are parallel to one another. Furthermore, the expression is also to convey that the mid-points of coaxial components lie on the same axis of rotation or axis of symmetry. However, these mid-points can optionally lie at different axial positions on this axis and the mentioned planes can thus be at a distance>0 from one another. The expression does not necessarily require that coaxial components have the same radius.

The term "complementary" in connection with two components that are "complementary" to one another means that their outer forms are designed such that one component can be arranged preferably completely in the component that is complementary thereto, so that the inner surface of one component and the outer surface of the other component are in contact with one another ideally without any gaps, or over the entire surface. Consequently, in the case of two objects that are complementary to one another, the outer form of one object is thus defined by the outer form of the other object. The term "complementary" could also be replaced by the term "inverse".

In the figures, for the sake of clarity, in cases where components are present multiple times, often not all the components shown are provided with their reference signs.

The described embodiments can be combined as desired. Likewise, individual features of the embodiments can also be combined without departing from the essence of the invention.

FIG. 1 shows a representation, partially in perspective, of a drive of a wheel assembly 1 by a transmission-motor unit 2. The wheel assembly 1 can be a single wheel or twin tires. The transmission can be a single- or multi-stage transmission or a planetary transmission—in this case, it is a single-stage transmission. The dynamoelectric machine 3 can be a permanently excited synchronous machine or an asynchronous motor with a cage rotor, or an asynchronous motor with electrical excitation by means of slip rings.

The dynamoelectric machine 3 is accommodated in an axle housing, wherein the stator 2 and/or the housing have means for liquid cooling 21.

In this embodiment, the lamination stack of the rotor 5 is fixed to a support structure 6, which is of low-inertia form. This can in particular be spoke-shaped. This support structure 6 is connected in a rotationally fixed manner to a transmission input shaft 9 in order to transmit the torque of the motor 3 into the transmission and ultimately make it available as the driving torque of the wheel assembly. The rotor 5 is in an overhung position, that is to say it does not have an explicit bearing, but the bearing 10 of the transmission input shaft 9 supports the rotor 5.

The driving torque of the wheel assembly 1 is made available by way of a transmission output shaft 12, which is connected in a rotationally fixed manner to the wheel assembly. The bearing 15 of the transmission output shaft 12 is supported inter alia in the axle housing 11. The axle 16 of the wheel assembly 1 and the axle 17 of the motor 3 are arranged in parallel.

FIG. 2 shows, in a longitudinal section in principle, the transmission-motor unit, which is accommodated in the axle housing 11. The lamination stack 7 of the rotor 5 is positioned on a support structure 6 which is substantially double-T-shaped. The central piece is of spoke-like form in order to reduce the inertia. A liquid cooling jacket is provided between the lamination stack 8 of the stator 4. The motor compartment is separated from the transmission compartment, so that the transmission can be provided with oil, while the motor compartment has air cooling, in particular closed air cooling.

The bearings shown in FIG. 2 are, merely by way of example, in the form ball bearings. Depending on the design of the electric axle, other bearings or bearing arrangements with the respective rolling bodies are also possible and can function as fixed bearings or movable bearings. These are, inter alia, angular ball bearings (single-row, double-row, etc.), cylindrical roller bearings or spherical roller bearings. In the case of an installation in pairs, they can be arranged in an O-shaped arrangement or in an X-shaped arrangement.

FIG. 3 shows an electric axle with two transmission-motor units, each of which drives a wheel assembly 1. By means of the construction according to the invention, a compact arrangement can now be provided, which thus increases the usable volume of a commercial vehicle. In particular, the central aisle in an electric bus 18 can be made wider as a result of this arrangement.

Further possibilities for a low-inertia form of the rotor 5 will be described hereinbelow.

The representation of FIG. 4 shows the rotor 5 of the dynamoelectric machine 3 in cross section. The rotor 5 has a circular structure in the outer region. The circular structure, which is referred to as the outer annulus, serves as a means for torque absorption at the rotor 5. Torques arise as a result of means for excitation of the rotor 5. If these means are already located on the rotor, which is not the case in FIG. 4, then they are part of the rotor 5. Means for excitation are, for example, permanent magnets or electrical conductors, which in the case of asynchronous machines, for example, form a cage or in the case of synchronous machines guide a fed current. During operation of the dynamoelectric machine 3, a torque or a force is exerted on these means for excitation, said torque or force being transmitted to the rotor 5 because the means for excitation are part of the rotor 5. The outer annulus shown in FIG. 4, which constitutes the means for torque absorption, serves as the means for torque absorption at the rotor. The means for torque absorption at the rotor 5 also serves as a region which guides the flux. In FIG. 4, this region is designated the flux guide ring 50, which constitutes the outer ring and corresponds to the means for torque absorption at the rotor 5.

Because the rotor 5 in this embodiment can be implemented as a juxtaposition of a plurality of rotor plates, means for connecting these rotor plates together are to be provided. Such a connection can be implemented inter alia by way of retaining holes 16, in that a retaining rod, for example, is guided through the retaining holes, by means of which retaining rod rotor plates are held together. Retaining holes 16 are distributed over the inner radius of the flux guide ring 50. A symmetrical distribution is advantageous, in order also to symmetrically absorb forces that occur.

If a torque is exerted on the means for torque absorption at the rotor 5, this torque is to be transmitted to the transmission input shaft 9. Forces are to be guided into the inner region of the rotor 5. According to FIG. 4, this takes place by way of secant-like walls 62. FIG. 4 shows an embodiment with six secants, which are connected in the region of the retaining holes 63 to the flux guide ring 50 and form a polygon inside the rotor 5. The polygon is in the form of a polygonal ring 48. The transmission input shaft 9 is located in the central circular opening thereof. Torques that occur due to means for excitation are transmitted by way of the means for torque absorption at the rotor 5 to the secant-like walls 62. Forces that occur are then further guided by these secant-like walls 62 into the interior to the polygonal ring 48. The polygonal ring 48 can be connected in a rotationally fixed manner to the transmission input shaft 9 by way of a feather key combination, for example.

Force transmission between the polygonal ring 48 and the transmission input shaft 9 is not limited solely to feather key combinations, because other mechanisms for force/torque transmission can also be used. These are, for example, material-based connections, for example by adhesive bonding or welding, or positive-locking connections as in the case of feather keys but in a different geometric form, such as, for example, polygons, or force-based connections in which, for example, the rotor 5 is shrunk onto the transmission input shaft 9.

By the use of secant-like walls 62, means for inertia reduction are formed. The weight reduction associated therewith changes the moment of inertia in a positive manner, so that a dynamoelectric machine 3 having the corresponding rotor 5 gains dynamics, inter alia. A reduced weight, that is to say a lower mass, of a body reduces the inertia of the body. The reduction in inertia is obtained not only from the general weight reduction but in particular also from the location and position of those points of the rotor at which there is a weight reduction.

In the present example of FIG. 4, the rotor 5 is the rotary system. Because openings are made possible in particular on the outer sides of the rotor as a result of the external secant-like walls 62, a large reduction in the moment of inertia of the rotor 5 as a whole is obtained.

The rotor 5 according to FIG. 4 is, as described, functionally divided into three parts. Firstly, into the part that guides the magnetic flux, carries the magnets and is referred to as the flux guide ring 50. Secondly, into the part that transmits the torque from the magnets, or the excitation or the return path components, to the shaft and that is represented in FIG. 4 by the secant-like walls 62. The third part of a rough subdivision is formed by the connection to the transmission input shaft 9, which is referred to in FIG. 4 as the polygonal ring 48 and forms the means for force transmission between the rotor 5 and the transmission input shaft 9.

The representation according to FIG. 5 shows the cross section of the rotor 5 having a means for torque absorption at the rotor 5, a flux guide ring 50, retaining holes 63 and a polygonal ring 48. Compared to FIG. 4, the secant-like walls 62 therein have been converted into a honeycomb structure 49. Force transmission from the polygonal ring 48 to the transmission input shaft 9 also takes place inter alia by way of a feather key combination. The strength of the rotor 5 can be increased by increasing the number of walls and part-walls which form this honeycomb structure 49. As a result of the larger number of secant-like walls and/or part-walls, a more homogeneous force transfer to the walls/part-walls, or from the walls/part-walls to the polygonal ring 48, can be achieved. A reduction in the material thickness of the flux guide ring 50 and/or of the polygonal ring 48 is thus made possible. This in turn reduces the moment of inertia.

The stiffness can be influenced by the form of walls and part-walls, or also by the choice of the material of which the walls consist. If a honeycomb structure 49 is designed with flexible walls, then the rotor 5 acts as a damper or spring between the motor and the load that is driven by the motor. The flexibility of the honeycomb structure 49 can also arise from a flexibility of the connection points between the walls.

The representation according to FIG. 6 shows a rotor 5 having means for torque absorption, retaining holes 63, as in the preceding figures. The honeycomb structure 49 according to FIG. 5 is implemented in FIG. 6 in an advantageous embodiment as a honeycomb-like foam structure 61. The difference with respect to FIG. 5 consists in that the voids of the honeycombs have been made considerably smaller and are closed. Linear foams are inexpensive materials and differ greatly in terms of their properties. In this way, depending on the application, a solid or rigid foam with low or no resilient or damping properties can be used. A soft, flexible foam has pronounced or great resilient or damping properties. The force transmission from the means for torque absorption at the rotor 5 to the foam takes place, for example, via positive-locking means 64 for force transmission, which in FIG. 6 are in the form of wedges in the outer region. Force transmission to the transmission input shaft 9 (not shown in FIG. 6) takes place via shaft-hub connections known per se.

Permanent magnets are positioned on or in the flux guide ring 50, said magnets here representing the means for excitation. External permanent magnets are advantageously connected to the flux guide ring 50 via a bandage. The flux guide ring can be in the form of a lamination stack. The bandage absorbs centrifugal forces of the permanent magnets in the case of rotational movements, which are arranged on the surface of the flux guide ring.

Commercial vehicles within the meaning of the invention are especially electrically driven buses or trucks for road traffic, or special vehicles, for example in mines above and/or below ground. In principle, the invention is also suitable for all electrically driven vehicles having an electric axle and the two transmission-motor units thereof, thus also for passenger cars. This concerns both purely electric drives and hybrid drives of the above-mentioned vehicles.

The invention claimed is:

1. A commercial vehicle comprising:

an electric axle, the electric axle comprising a transmission-motor unit associated with a wheel assembly, wherein the transmission-motor unit comprises;

a transmission, the transmission comprising a bearing;

a dynamoelectric machine, the dynamoelectric machine comprising a stator and a rotor, wherein the rotor is connected in a torque-transmitting manner to the wheel assembly by way of the transmission, wherein the rotor is in an overhung position and is supported by the bearing of the transmission; and an axle housing, wherein the transmission and the dynamoelectric machine are completely received in the axle housing.

2. The commercial vehicle of claim 1 wherein the transmission is a reduction transmission.

3. The commercial vehicle of claim 1 wherein the rotor comprises a spoke-like support structure and a lamination stack fixed to the spoke-like support structure.

4. The commercial vehicle of claim 3 wherein the lamination stack of the rotor has a spoke-like or honeycomb form.

5. The commercial vehicle of claim 1 wherein an axial extent of the rotor corresponds to 0.3 to 0.7 times a diameter of the rotor.

6. The commercial vehicle of claim 1 wherein a superordinate controller of an electric drive of the commercial vehicle forms at least one electric differential.

7. The commercial vehicle of claim 1 wherein the transmission comprises a transmission input shaft that is rotatably supported by the bearing and wherein the bearing is supported by the axle housing.

8. The commercial vehicle of claim 7 wherein the transmission input shaft is cantilevered from the bearing and the rotor is supported by the transmission input shaft.

9. The commercial vehicle of claim 8 wherein the transmission input shaft is completely received inside the axle housing.

10. The commercial vehicle of claim 1 wherein the transmission further comprises a transmission output shaft that extends out of the axle housing.

11. The commercial vehicle of claim 1 further comprising a motor cover that encloses an end of the axle housing, wherein the motor cover is encircled by the rotor.

12. The commercial vehicle of claim 11 wherein the rotor comprises a first end that faces toward the cover and a second end opposite the first end, wherein the rotor is positioned on a support structure that extends from a transmission input shaft of the transmission, the transmission input shaft is cantilevered from the bearing, and the support structure is positioned closer to the second end of the rotor than to the first end of the rotor.

13. The commercial vehicle of claim 12 wherein the support structure has a T-shaped cross section.

14. The commercial vehicle of claim 1 wherein the axle housing defines a motor compartment that receives the dynamoelectric machine and a transmission compartment that receives the transmission, wherein the motor compartment is separated from the transmission compartment.

15. The commercial vehicle of claim 14 wherein the motor compartment is air cooled and the transmission compartment is provided with oil.

16. The commercial vehicle of claim 15 further comprising a motor cover that encloses an end of the axle housing, wherein the motor cover is encircled by the rotor;

wherein the transmission comprises:

a transmission input shaft that is rotatably supported by the bearing, wherein the bearing is supported by the axle housing, the transmission input shaft is cantilevered from the bearing, and the transmission input shaft is completely received inside the axle housing; and a transmission output shaft that extends out of the axle housing; and wherein the rotor comprises:

a first end that faces toward the motor cover and a second end opposite the first end, wherein the rotor is positioned on a support structure that extends from the transmission input shaft and the support structure is positioned closer to the second end of the rotor than to the first end of the rotor.

17. The commercial vehicle of claim 16 wherein the axle housing is a unitary one-piece component and the motor cover is fastened to the axle housing.

18. The commercial vehicle of claim 1 further comprising a motor cover that encloses an end of the axle housing, wherein the motor cover is encircled by the rotor;

wherein the transmission comprises:

a transmission input shaft that is rotatably supported by the bearing, wherein the bearing is supported by the axle housing, the transmission input shaft is cantilevered from the bearing, and the transmission input shaft is completely received inside the axle housing; and a transmission output shaft that extends out of the axle housing; and wherein the rotor comprises:

a first end that faces toward the motor cover and a second end opposite the first end, wherein the rotor is positioned on a support structure that extends from the transmission input shaft and the support structure is positioned closer to the second end of the rotor than to the first end of the rotor.

19. The commercial vehicle of claim 18 wherein the axle housing is a unitary one-piece component and the motor cover is fastened to the axle housing.

* * * * *